United States Patent

Wanlass

[15] 3,654,546
[45] Apr. 4, 1972

[54] METHOD AND APPARATUS FOR REGULATING VOLTAGE BY UTILIZING THE STABLE OSCILLATION STATE OF A PARAMETRIC DEVICE

[72] Inventor: Leslie Kent Wanlass, Newport Beach, Calif.

[73] Assignee: Wanlass Electric Company, Santa Ana, Calif.

[22] Filed: May 5, 1969

[21] Appl. No.: 821,933

Related U.S. Application Data

[63] Continuation-in-part of Ser. No. 589,780, Oct. 26, 1966, abandoned.

[52] U.S. Cl............................323/6, 321/25, 321/68, 323/60, 323/66, 323/81
[51] Int. Cl..............................G05f 1/32, G05f 7/00
[58] Field of Search..................323/6, 44, 45, 48, 56, 60, 323/57, 66, 81; 321/25

[56] References Cited

UNITED STATES PATENTS 2,694,177  11/1954  Sola...........................................323/60
3,403,323  9/1968  Wanlass....................................323/56
3,443,198  5/1969  Wanlass..................................323/56 X

OTHER PUBLICATIONS

Proceedings of National Electronics Conference; 1949, Vol. 5, pages 450– 466; " The Magnetic Cross Valve and its Application to Subfrequency Power Generation" by Harold J. McCreary Primary Examiner—Gerald Goldberg
Attorney—Hawson and Hawson

[57] ABSTRACT

A method of regulating voltage by transferring energy from an unregulated voltage source to a parametric device to maintain it in its stable oscillating state. A method of filtering employing the same parametric principles is also disclosed, as are parametric devices in which a capacitor is coupled to an inductor to form a resonant circuit, the inductance of the inductor being varied electrically at twice the frequency to which the resonant circuit is tuned.

26 Claims, 15 Drawing Figures

Patented April 4, 1972

INVENTOR
LESLIE KENT WANLASS
BY
Lyon & Lyon
ATTORNEYS

Patented April 4, 1972  3,654,546
3 Sheets-Sheet 2
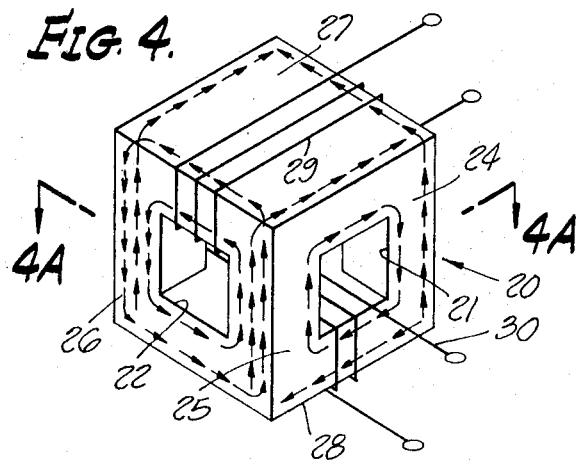
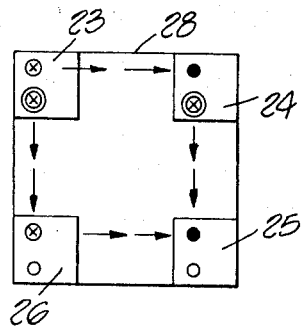
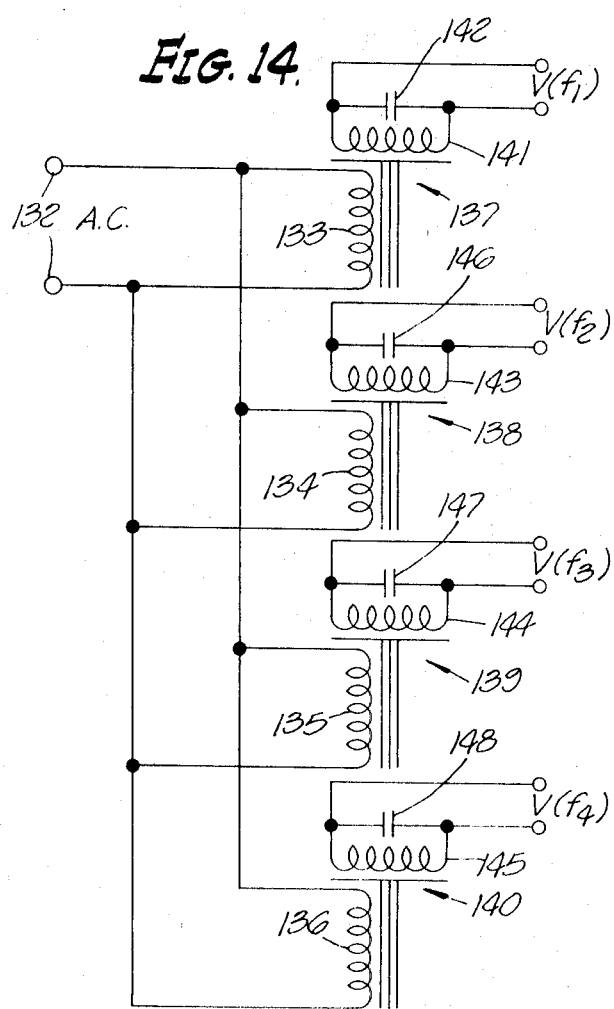
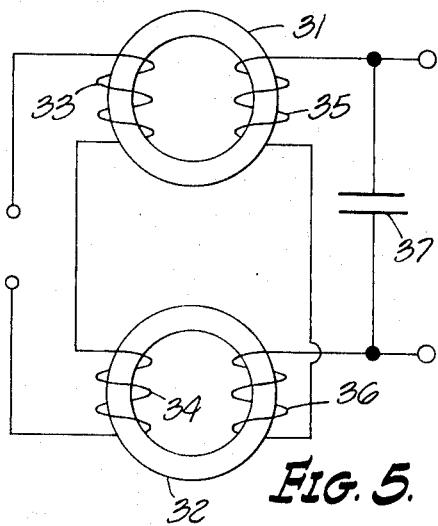
INVENTOR.
LESLIE KENT WANLASS
BY
*Lyon & Lyon*
ATTORNEYS Patented April 4, 1972

INVENTOR
LESLIE KENT WANLASS
BY
Lyon & Lyon
ATTORNEYS

METHOD AND APPARATUS FOR REGULATING VOLTAGE BY UTILIZING THE STABLE OSCILLATION STATE OF A PARAMETRIC DEVICE

CROSS-REFERENCE TO OTHER APPLICATION

This application is a continuation-in-part of my copending application Ser. No. 589,780 filed Oct. 26, 1966 and entitled "Parametric Device."

BACKGROUND OF THE INVENTION

Various types of parametric devices have been proposed in the past for numerous circuit applications, most commonly as amplifiers for signals in the microwave range or as binary computing elements for high speed computers. Such parametric devices produce amplification or oscillation by means of the variation of an energy storage parameter, and generally comprise an L-C resonant circuit in which the value of either the inductance or capacitance is varied at a critical time to add energy to the system. This addition of energy is called pumping and maximum energy is transferred if energy is added to the resonant circuit at the peaks of its output waveform, that is, if the pumping frequency is twice that of the output frequency and properly phased therewith. The L-C circuits of typical parametric devices utilize either a non-linear inductance element such as a saturable core having a pair of windings thereon, or one or more non-linear capacitors such as a silicon diode whose capacitance is dependent on the voltage impressed across it. In the case of a variable inductance device, the core is biased toward saturation and the pumping signal is applied to one of the windings and the other winding connected in the resonant circuit while in the case of a variable capacitance device the pumping signal is applied directly to the capacitor in the resonant circuit. Because of the nature of these inductors and capacitors, previously proposed paramagnetic devices have been restricted to very high frequency, very low power applications. Moreover, the requirement of a pumping source of twice the frequency of the output limits the use of such devices.

When properly constructed such parametric circuits are essentially self-starting oscillators whose oscillations build up to a certain amplitude and then remain constant at that amplitude. Parametric oscillation is usually treated and explained in the literature in terms of Matheiu's equation. Such a treatment and explanation, together with additional explanatory material relating to parametric devices can be found in an article by E. Goto, entitled "The Parametron, a Digital Computing Element which Utilizes Parametric Oscillation" published in the Aug. 1959 issue of the *The Proceeding of the IRE*. As explained in that article, by making certain assumptions a curve can be plotted which has a saddle point at the origin and two spiral points which indicate the stable states of stationary oscillation and which are displaced from each other by 180°. Such a curve is shown herein in FIG. 1.

18. A method of producing a regulated AC

In the referenced article, the author mentions that oscillation of a parametric device in the stationary state is extremely stable and states that this difficulty can be overcome, as it must in order for his binary element to operate properly, by providing means for quenching the oscillation so that the stable state condition is not reached.

SUMMARY OF THE INVENTION

According to the present invention, a method and apparatus are provided that utilize the stable oscillation state of a parametric device for beneficial purposes, namely, for providing a regulated output voltage from an unregulated source, or for filtering a single frequency from a multi-frequency signal. These purposes are preferably accomplished by using as the inductance component of an L-C resonant circuit of a parametric device the load winding of a variable inductor device of the type disclosed in my U.S. Pat. No. 3,403,323. The theoretical considerations and operating principles of this variable inductor are described in detail in my patent, the disclosure of which is incorporated by reference herein. Briefly, the variable inductor disclosed in my patent comprises a ferromagnetic core having a pair of windings thereon. The core is constructed so that it has four common regions or "legs" and two end or joining portions for magnetically coupling the common regions. The coils are wound on the end portions with their axes displaced at 90° so that normally there is no inductive coupling between them, and so that the flux components generated as a result of passing currents through the two windings are at all times in opposing relationship in two of the legs and in additive relationship in the other two legs. As a result of this construction the current in one of the windings, referred to as the control winding, generates a magnetic flux which controls the reluctance of the magnetic circuit encompassed by the second winding, referred to as the load winding, in such a manner that variations in this flux caused by variations in the current in the control winding cause the hysteresis loop of the magnetic circuit encompassed by the load winding to be effectively rotated thereby varying the inductance of the load winding. The relationship between control current and load winding inductance is shown in FIG. 2.

Since, as discussed in my patent, inductance is an absolute quantity, it does not follow zero crossings of the phenomena causing it, but rather in effect provides full wave rectification of the causal phenomena. Therefore, if an alternating current is applied to the control winding of an inductor of the type described, the inductance of the load winding will be controlled in accordance with the alternating current in the control winding, but because the inductance ignores the polarity of the alternating current, the inductance change will be at twice the frequency of the alternating current applied to the control winding as shown in FIG. 3. This is precisely what is required for the operation of a parametric device. Therefore, by coupling the load winding of such an inductor to a suitable capacitor to form a resonant circuit, energy can be transferred to the resonant circuit by pumping the control winding with an alternating current of the same frequency as that to which the resonant circuit is tuned, that is, the output frequency. The energy transfer takes place as the result of the second term of the basic equation for energy transfer:

$$E_s = d\frac{Li}{dt} = L\frac{di}{dt} + i\frac{dL}{dt}$$

where, $E_s$ = voltage induced in output winding
$L$ = inductance of output winding
$i$ = current in output winding Since, as pointed out previously, there is no mutual inductance between the windings of the variable inductor, no magnetic flux coupling occurs and thus the first term of the foregoing equation is very small. This results in excellent isolation between the two windings and the filtering out of transients such as SCR spikes in the line, with the result that the output can be made an almost perfect sine wave. This isolation, of course, is also present in the opposite direction, i.e., from load to line.

While the use of a variable inductor of the type disclosed in my aforementioned patent is preferred, a parametric device that can accomplish most of the desired results can also be constructed using a pair of conventional cores on which are wound a pair of windings, the input windings being wound in additive relationship and the output windings being balanced and wound in series opposition or bucking relationship and connected in parallel with a capacitor to form the resonant circuit. As will be apparent, the isolation provided by this construction will be much inferior to that provided by my patented inductor as transformer or flux coupling exists between the windings of each core. It should be noted that, contrary to conventional practice, as illustrated, for example, in the cited Goto article, the cores are not DC biased, it being necessary that the flux generated in them pass through zero to accomplish the required frequency doubling.

As will be apparent, the fact that the pumping frequency of these parametric devices is the same as the output frequency opens up many new applications for the devices as does the fact that they can be provided with a high power rating. It has, for example, been found that the use of the parametric devices of the present invention permits extremely accurate voltage regulation at conventional power frequencies when the power line is connected to the control winding. Since, as pointed out previously, it is extremely difficult to change the amplitude of oscillation of a parametric device oscillating at a stable point, the normal variations of the line voltage used as the pumping source have no effect on the amplitude of the output from the resonant circuit. Moreover, overloading, caused, for example, by a short in the load, will not result in current limiting as in currently available constant voltage transformers, but rather will have the effect of driving the parametric device out of its stable point and preventing it from building up again with the result that the output will be completely removed. Once the disabling condition is rectified, the circuit will immediately build up to the stable oscillation point and the regulated output voltage will be restored. Since the resonant circuit can be properly pumped only at a given frequency (or in some cases a submultiple thereof) an excellent method of filtering is provided — one in which the frequency discrimination is very good and yet which permits passage of large amounts of power.

It is therefor an object of the present invention to provide a resonant regulator.

It is also an object of the present invention to provide a method of parametric voltage regulation.

It is another object of the present invention to provide a method of parametric filtering.

It is another object of the present invention to provide a parametric device capable of handling high power signals over a broad frequency range.

It is also an object of the present invention to provide a parametric device having a pumping frequency equal to the output frequency.

It is another object of the present invention to provide such a parametric device in which the pumping or energy transfer to an L-C resonant circuit is accomplished by varying the inductance of the circuit.

It is a further object of the present invention to provide such a parametric device which is useful as a regulator, an inverter, a filter, an amplifier or the like.

It is a still further object of the present invention to provide a method and apparatus for regulating voltage.

The objects and advantages previously described will become more apparent upon reference to the accompanying description and drawings in which:

BRIEF DESCRIPTION OF THE DRAWINGS

FIGS. 4 and 4A illustrate the preferred embodiment of an inductor for use in a parametric device according to the present invention;

FIG. 5 illustrates another embodiment of a parametric device according to the present invention;

FIG. 14 is a schematic diagram of a filtering circuit according to the present invention.

Figure 1:
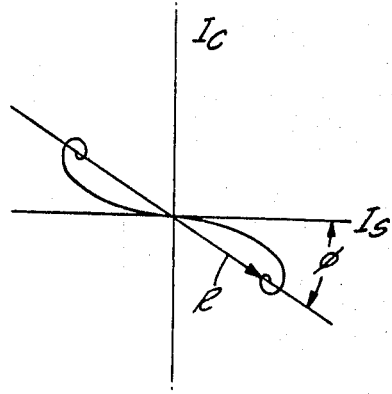
FIG. 1 is a curve illustrating the modes of oscillation of a parametric device in the phase plane.

In the drawings, the convention adopted in my aforementioned patent for indicating a core according to the teachings of that patent is followed, that is, such a core is indicated by the use of a T-shaped iron symbol. While any of the various core structures illustrated and described in my patent could be used in this invention, in the circuits according to this invention which have actually been built, cores similar to that shown in FIG. 7 of my patent have been used. Because the preferred embodiment of the present invention utilizes the inductor disclosed in my patent, the various circuit embodiments disclosed herein are illustrated as employing a parametric device including this inductor. It should be understood, however, that the parametric device shown in FIG. 5 could also be used, as could other equivalent parametric devices.

Turning now to FIG. 1, there is shown a typical curve illustrating the amplitude-to-phase locus of an oscillating parametric device. The abscissa represents the sine component $I_s$ and the ordinate, the cosine component $I_c$. If polar coordinants R (amplitude) and $\phi$ (phase) are introduced in the $I_s$, $I_c$ plane it can be seen that R and $\phi$, respectively, indicate the instantaneous amplitude and phase of the oscillation. The saddle point at the origin indicates the exponential buildup of oscillation which is in a definite phase relation to the pumping signal. The spiral points in the Figure indicate the stable states of stationary oscillation. The choice between these two modes of stationary oscillation is effected entirely by the sign of the sine component of the small initial oscillations that exist in the circuit. An initial oscillation of quite small amplitude is sufficient to control the mode or the phase of stationary oscillation of large amplitude which is to be used as the output signal and hence an amplifying action is obtained. A more complete treatment of the mathematical and physical phenomena involved in parametric oscillation can be found in the literature, for example the previously cited Goto article. While all of the assumptions made in the literature in order to obtain the curve shown in FIG. 1 may not precisely apply to the present invention, it is believed that reference to this Figure and an understanding of it are helpful in understanding the operation of the present invention and it is therefore included for that purpose.

Figure 2:
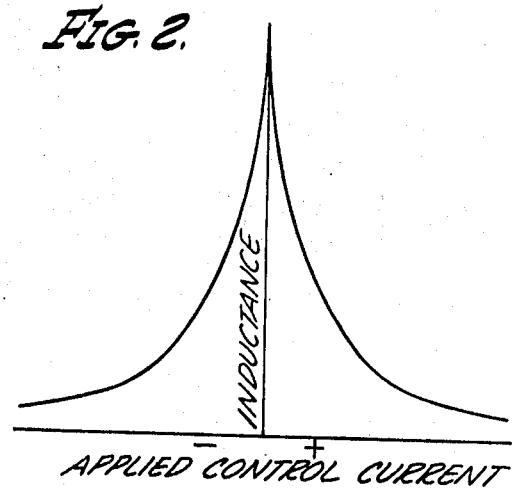
FIG. 2 is a curve illustrating the inductance control current characteristic of a variable inductance device used in the present invention.
Figure 3:
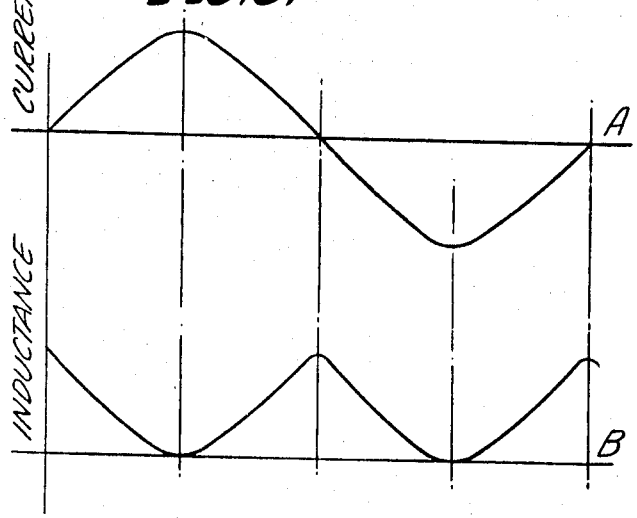
FIG. 3 illustrates the variation of the inductance of such a variable inductor in response to an AC control current.

FIGS. 2 and 3 illustrate the relationship of the inductance of the load winding of a variable inductor constructed in accordance with the teachings of my patent with the current applied to the control winding thereof. These relationships are also generally true for the inductor shown in FIG. 5. FIG. 2 shows that the inductance presented by the load winding is at a maximum when the current in the control winding is zero and decreases in the same manner irrespective of the polarity of the current applied to the control winding. FIG. 3 shows the manner in which the inductance of the load winding varies when an alternating current is applied to the control winding. Curve A plots current in the control winding versus time while curve B plots inductance of the load winding versus time. As can be seen, the inductance of the load winding reaches a maximum at 0° and 180°, that is, when the control current is zero, and a minimum at 90° and 270°, that is, where the control current is at a maximum. Thus, the inductance change of the load winding is at a frequency twice that of the current applied to the control winding.

FIGS. 4 and 4A illustrate a variable inductor according to my aforementioned patent. As can be seen, the inductor comprises a magnetic core 20 provided with intersecting transverse passageways 21 and 22. The core 1 is thus provided with four legs or common regions 23, 24, 25 and 26 and two end or cap regions 27 and 28 magnetically joining the common regions. A first winding 29 is wound around the end region 27 through the opening 22 and a second winding 30 is wound around the end region 28 through the opening 21. If an alternating current is present in each of the windings 29 and 30 the fluxes shown in FIGS. 4 and 4A will exist in the core 10, and cause the device to operate in the manner described previously.

FIG. 5 illustrates a parametric device incorporating a different type of variable inductor. In this device, a pair of magnetic cores 31 and 32 are provided with input windings 33 and 34 respectively. The cores are further provided with output windings 35 and 36 respectively. As can be seen, the windings 33 and 34 are connected in series additive relationship. The output windings 35 and 36 are connected in series opposition or bucking relationship and in parallel with a capacitor 37 to form a resonant circuit. A change in the current in the windings 33 and 34 causes a change in the inductance of the windings 35 and 36 because of the non-linearity of the magnetic material of the cores 31 and 32. Since the inductance is an absolute quantity and no magnetic bias is used, the frequency of inductance change in windings 35 and 36 is twice that of the input frequency and thus the necessary condition for parametric action is present.

Figure 6:
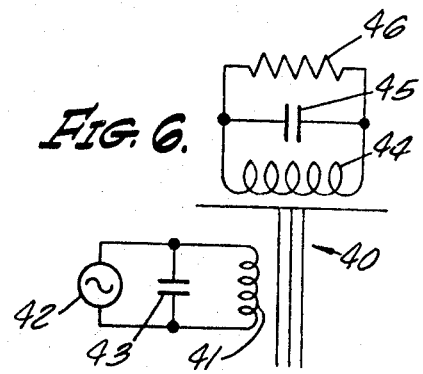
FIG. 6 is a schematic diagram of a first embodiment of a voltage regulating circuit according to the present invention.

Turning now to FIG. 6, there is shown a voltage regulator constructed in accordance with the present invention. A variable inductor 40 of the type described in my patent has its control winding 41 connected to a source 42 of voltage to be regulated, for example, a conventional 60 cycle/second, 120 volt power line. A capacitor 43 may be connected across the winding 41 to reduce the input surge current and correct the power factor of the unit; however, this capacitor is not required for proper circuit operation. The load winding 44 of the inductor 40 is connected in parallel with a capacitor having a value such that the L-C circuit made up of the winding 44 and capacitor 45 is tuned to a frequency of approximately 60 cycles/second. A load, represented by resistor 46 is connected across the resonant circuit 44, 45.

The circuit of FIG. 6 operates in the manner set forth above. When a signal is produced by the source 42, the alternating current passing through the winding 41 causes the inductance of the winding 44 to vary at twice the frequency of the source 42, as shown in FIG. 3. Because of inevitable noise, at least a component of which will be at the frequency to which the L-C circuit 44, 45 is tuned, a small signal will be present in the tuned circuit. In some cases, particularly in large capacity units, it may be desirable to start oscillation by inducing a voltage in the output winding through flux coupling with the input winding. This can be accomplished by making the unit slightly non-symmetrical or by temporarily switching in several flux coupled turns. The energy transferred to the tuned circuit by the pumping action of the source 42 operating through the inductor 40 will cause this signal to increase in amplitude until a stable point is reached, the particular stable point reached being dependent upon the sign of the sine component of the noise or induced signal. In other words, the pumping action of the source 42, by changing the inductance of the winding 44 at twice the frequency to which the resonant circuit, 44, 45 is tuned, results in the onset of parametric oscillation. It will be observed that once the stable oscillation point is reached, variations in the amplitude of the output of the source 42 will not appreciably affect the output of the L-C circuit 44, 45 because of the very large signal required to drive the circuit away from its stable oscillating point. Moreover, because of the nature of the inductor 40, there is complete isolation of the load from the line and vice versa and the output waveform is essentially a pure sine wave independent of the input waveform. If the value of the capacitor 43 is properly selected, the device will be bilateral, i.e., it will pass power in either direction while providing a regulated output. This feature would be quite desirable, for example, in a power transmission and distribution system.

Figure 7:
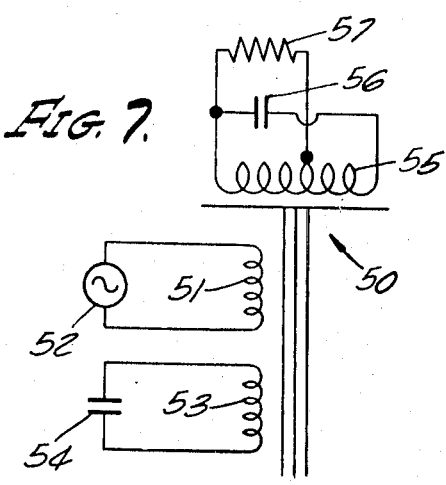
FIG. 7 is a schematic diagram of a first modification of the embodiment of FIG. 6.

FIG. 7 is a schematic diagram of a circuit very similar to that of FIG. 6 with certain practical considerations taken into account. In this Figure, a variable inductor 50 of the type described in my patent has its control winding 51 connected to a source of voltage 52, for example, the conventional 120 volt AC power line. A second winding 53 is wound on the same magnetic half core as the winding 51 and a capacitor 54 is connected across the winding 53. The capacitor 54 serves the same purpose as the capacitor 43 in FIG. 6 but the use of a separate winding 53 permits the establishment of a voltage across the capacitor 54 at which it can operate more efficiently. Similarly, the load winding 55 of the inductor 50 has a capacitor 56 connected across its entire length and the load 57 connected across only a portion of it. This arrangement permits the capacitor 56 to be operated at a higher voltage where it is more efficient, for example 600 volts, while maintaining the voltage across the load at a lower value, for example, 110 volts. The operation of the circuit is similar in all respects to that of FIG. 6.

Figure 8:
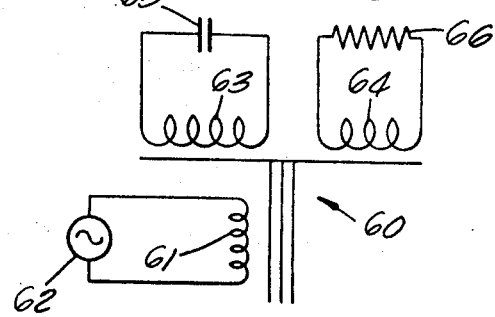
FIG. 8 is a schematic diagram of a second modification of the embodiment of FIG. 6.

In FIG. 8 there is shown another modification of this circuit. In this Figure, the variable inductor 60 of the type described in my patent has its control winding 61 connected to a source of AC voltage 62. Two windings 63 and 64 are wrapped on the core in place of the single windings 44 and 55 shown in FIGS. 6 and 7. These windings 63 and 64 are wound on the same half core and a capacitor 65 is connected across the winding 63 while a load 66 is connected across the output winding 64. The winding 63 and capacitor 65 serve as the resonant circuit to which energy is transferred by the pumping action of the source 62 and the control winding 61. The oscillating output of the tuned circuit 63 and 65 is transformer coupled to the output winding 64 so that a regulated output is produced across the load 66 in the same manner as previously described. The separation of the windings 63 and 64 permits a high voltage to be developed across the capacitor 65 so that this capacitor is operated more efficiently, and provides isolation of the load from the resonant circuit.

A circuit constructed in accordance with FIG. 8 was found to regulate very accurately with the following parameters:
Winding 61 equals 250 turns
Winding 63 equals 1,100 turns
Winding 64 equals 170 turns
Capacitor 65 equals 6 microfarads
Load resistance 66 equals 50 ohms
Core weight equals 6 pounds
Input voltage equals 120 volts, AC, 60 hertz
Output voltage equals 110 volts rms
Output power equals 250 VA The core used for this circuit was similar to that shown in FIG. 7 in my patent, that is, two C-cores rotated 90° and joined together.

Figure 9:
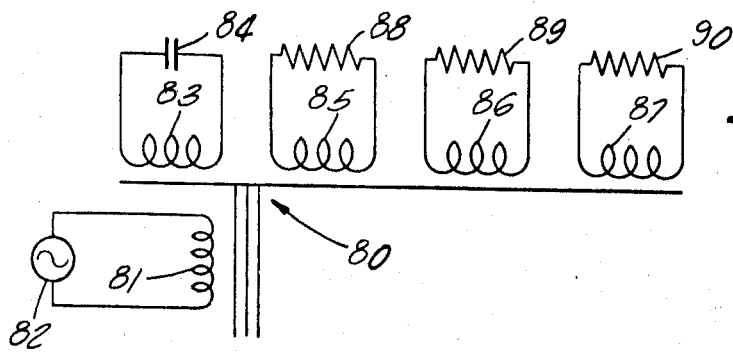
FIG. 9 is a schematic diagram of a third modification of the embodiment of FIG. 6.

If more than one regulated output voltage value is desired, or if isolation is required for practical reasons, the circuit of FIG. 9 can be used. In this circuit, an inductor 80 of the type described has its control winding 81 connected to a source 82 of AC voltage. As was the case in FIG. 8, a load winding 83 is provided across which is connected a capacitor 84 to form the resonant circuit. A plurality of output windings 85, 86 and 87 are also provided, each having its orientation with winding 83 so that they are transformer coupled thereto. By choosing the number of turns of the output windings 85, 86 and 87, any desired output voltage can be developed across the loads 88, 89 and 90. The manner in which the circuit operates is identical to that of FIG. 8.

Figure 10:
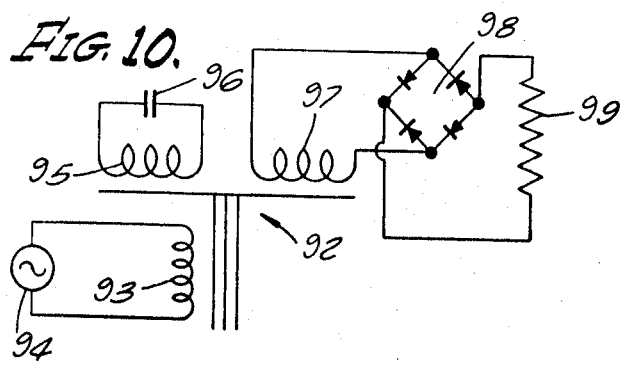
FIG. 10 is a schematic diagram of a fourth modification of the embodiment of FIG. 6.

FIG. 10 illustrates a circuit constructed according to the present invention which produces a regulated DC output voltage. In this circuit, an inductor 92 of the type described in my patent has its control winding 93 connected to a source of AC voltage 94. The load winding 95 has a capacitor 96 connected thereacross to form the resonant circuit. An output winding 97 which is transformer coupled to the load winding 95 has its output rectified by a full wave rectifier 98 and applied to a load 99. If desired, of course, a filtering network can be interposed between the rectifier 98 and load 99. The operation of the circuit of FIG 10 is identical to that of FIG. 8, that is the L-C resonant circuit 95, 96 produces an AC output voltage of constant amplitude. This output voltage is coupled to output winding 97 by transformer coupling and is rectified by the rectifier 98 and applied to the load 99 in a conventional manner. If desired, the rectifier 98 could be directly connected to the resonant circuit and the separate output winding eliminated. If desired, a plurality of output windings may be provided to supply different voltages.

Figure 11:
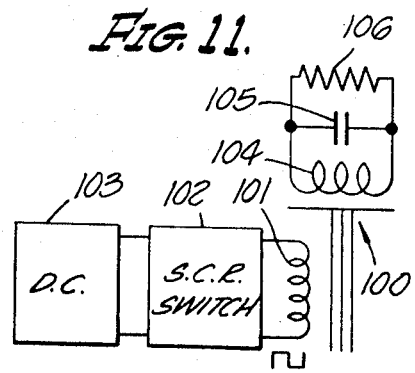
FIG. 11 is a schematic diagram of a DC-AC converter circuit according to the present invention.

FIG. 11 shows a DC–AC converter using the present invention. In this Figure, an inductor 100 of the type described in my patent has its control winding 101 connected to the output of an SCR switch 102 which is supplied by a source of DC voltage 103. The load winding 104 of the inductor 100 is connected in parallel with a capacitor 105 to form a resonant circuit tuned to the desired output frequency. The output of this resonant circuit is applied across a load 106. In operation, the SCR switch 102 chops the output of the DC source 103 at a frequency equal to the frequency at which the resonant circuit 104, 105 is tuned so that a square wave of this frequency is applied to the control winding 101. The operation of the switch 102 must be such that the square wave is AC, that is, that it has both positive and negative excursions. This is the manner in which most conventional SCR switches operate. As previously pointed out, the output waveform of the resonant circuit 104, 105 is independent of the waveform of the signal applied to the control winding 101. This is true even if the signal applied to the control winding is a square wave such as that produced by the SCR switch 102. Consequently, an essentially pure sine wave output at the desired frequency is obtained.

Figure 12:
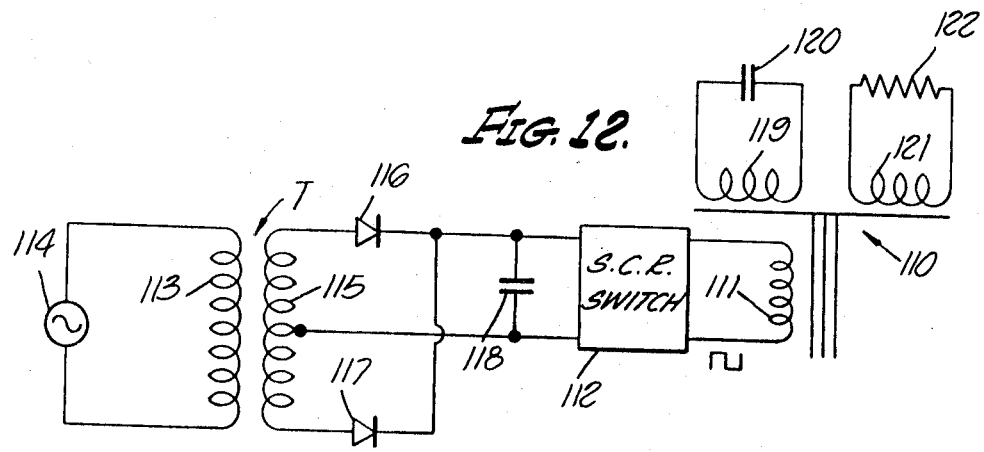
FIG. 12 is a schematic diagram of a frequency converter circuit according to the present invention.

FIG. 12 shows a frequency converter constructed in accordance with the present invention. In this Figure an inductor 110 of the type described in my patent has it control winding 111 connected to the output of an SCR switch 112 in the same manner as was the case with FIG. 11. A conventional transformer T has its primary winding 113 connected to the output of a source 114 of AC voltage of any given frequency. The voltage induced in the secondary 115 of the transformer T is rectified by diodes 116 and 117, filtered by capacitor 118 and applied to the input of the SCR switch 112. In some cases, it may not be necessary to rectify the input voltage before chopping it, particularly if the input or carrier frequency is much less than the chopping frequency.

As was the case in the case in FIG. 8, a first load winding 119 is connected in parallel with a capacitor 120 to form a resonant circuit tuned to the desired output frequency. A second load winding 121 wound so as to be transformer coupled to the winding 119 has a load 122 connected thereacross.

The operation of this circuit is similar to that of FIG. 11. The SCR switch 112 is adjusted to chop the rectified signal passed by the transformer T at a frequency equal to the desired output frequency. The AC square wave thus formed is passed through the control winding 111 with the result that the resonant circuit 119, 120 is pumped in the manner previously described and a regulated output is obtained across the load 122.

Figure 13:
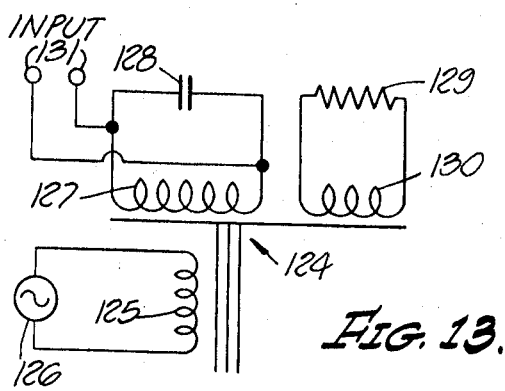
FIG. 13 is a schematic diagram of a parametric amplifier circuit according to the present invention.

Turning now to FIG. 13, there is shown a parametric amplifier constructed in accordance with the present invention. In this Figure, an inductor 124 of the type described in my patent has its control winding 125 connected across the source of AC voltage 126. The load winding 127 of inductor 124 is connected to a capacitor 128 to form a resonant circuit tuned to the desired output frequency. The output is taken across a resistor 129 connected to an output winding 130. The input of the circuit is applied to input terminals 131 which are connected across the load winding 127. In this case, the output of the tuned circuit 127, 128 is not dependent upon a noise signal but rather is dependent on the input to the terminals 131. This input, although of small amplitude, will cause the tuned circuit 127, 128 to begin to oscillate and these oscillations will be built up or amplified by the pumping action of the AC current passing through the control winding 125 in the manner previously described.

Fig. 14 illustrates a filtering network constructed in accordance with the present invention. The input signal, which may be composed of components of many different frequencies, is applied to input terminals 132. The input terminals are parallel connected to the input or control windings 133, 134, 135 and 136 of variable inductors 137, 138, 139 and 140 of the type described in my patent. The output winding 141 of inductor 133 is connected in parallel with a capacitor 142 to form a resonant circuit tuned to a frequency $f_1$. Similarly, the output windings 143, 144 and 145 of inductors 138, 139 and 140 are connected in resonant circuits with the capacitors 146, 147 and 148, the resonant circuits being tuned to frequencies $f_2$, $f_3$ and $f_4$ respectively. As has been pointed out, the resonant circuit must be pumped at approximately twice its tuned circuit frequency in order for parametric oscillation to occur. The required pumping frequency can be made quite precise with the result that each of the parametric devices coupled to the input terminals 132 will produce an output only if its input winding is provided with a signal of the proper frequency, i.e., the frequency to which the resonant circuit is tuned.

The parametric devices thus act as narrow band filters, producing an output signal only when a signal of proper frequency is impressed on the input terminals. However, unlike conventional narrow band filters, the parametric devices are capable of substantial energy transfer. This feature permits a substantial reduction in cost in a system such as that shown in FIG. 14. If conventional narrow band filters were employed, each would most likely have to be followed by an individual amplifier; by using the parametric device of the present invention, a single amplifier on the input lines would be sufficient. The excellent isolation provided by a parametric device employing my patented inductor insures that the output signals are not substantially degraded.

It should be noted that the parametric devices can be set into operation by submultiples of the tuned frequency as well as by this frequency itself. This is because the necessary pumping frequency is present in the subharmonics and in many cases the resonant circuit will store sufficient energy to sustain oscillation even though the circuit is not pumped at each half cycle of its output waveform. However, this characteristic does not adversely affect the utility of the circuit of FIG. 14 as it is only necessary to select input signals of frequencies which are not submultiples of each other, a precaution that is commonly taken in conventional filtering schemes.

It should be recognized that although the parametric devices utilize in FIG. 14 operate very effectively as narrow band filters, this operation is not different in kind from their operation as voltage regulators in the manner previously described. The output of each is a regulated voltage which will remain as long as the input signal of the selected frequency has a magnitude sufficient to transfer enough energy to sustain oscillation. The converse is also true, that is, a parametric device employed as a voltage regulator will cease to produce an output if the input frequency deviates sufficiently from the resonant frequency of the resonant circuit. Of course, as will be apparent to those skilled in the art, the device generally will be more finely tuned when employed as a filter than when employed as a voltage regulator.

It should be understood that in these embodiments previously illustrated and described as having a separate output winding, the output may, if desired, be taken directly across the resonant circuit. Similarly, in those embodiments where output is taken directly across the resonant circuit, one or more additional output windings could be provided if desired.

In my patent, it is pointed out that frequency doubling can be prevented by impressing a suitable bias on the core of a magnitude sufficient to prevent zero crossing of the flux causing the inductance change. Such a bias can be used in connection with the present invention although if it is used, the pumping frequency will have to be double the output frequency as in the conventional parametric device. The device of the present invention will still retain its other advantages, such as a high power handling capacity.

As used herein and in the claims the term "AC" as applied to a voltage or current or signal is not meant to be limited to a sine wage signal but rather is meant in its broadest sense as applying to a waveform that has cyclic positive and negative excursions.

From the foregoing description it can be seen that a method has been provided for producing a regulated and/or filtered voltage by utilizing the stable oscillating characteristic of a parametric device. Improved parametric devices have also been provided that are capable of operating over a wide frequency band and at high power levels. The improved parametric devices also have the great advantage of operating with a pumping frequency equal to the tuned frequency of the resonant circuit. The parametric device utilizing the inductor described in my patent have the further advantages of providing extremely good isolation and of being extremely rugged and inexpensive to manufacture.

The invention may be embodied in other specific forms not departing from the spirit or central characteristics thereof. The present embodiments are therefore to be considered in all respects as illustrative and not restrictive.

What is claimed is:

1. A voltage regulator comprising
   a parametric device employing an inductor comprising a winding wound on magnetic core means, a capacitor, and means connecting said inductor and said capacitor as a resonant circuit, and
   means for coupling a source of unregulated AC voltage to said resonant circuit such that said unregulated voltage causes the inductance of said inductor to vary at twice the frequency of said unregulated voltage and maintains said oscillations at a stable point, and
   output circuit means coupled to said resonant circuit for delivering said regulated voltage, said parametric device providing complete isolation of the output from the input, the output waveform being determined by the resonant circuit.

2. The regulator of claim 1 wherein said core means comprises a magnetic core having four common regions and two end portions magnetically joining said common regions.

3. The regulator of claim 1 wherein said core means comprises a pair of cores, each of said windings having portions wound on each of said cores.

4. The regulator of claim 3 wherein said portions of said control windings are in adding relation and said portions of said inductor winding are in bucking relation.

5. A voltage regulator comprising:
   a source of AC voltage to be regulated;
   a variable inductor comprising a magnetic core having four common regions and two end regions magnetically joining said common regions, a load winding wound on said core and encompassing a magnetic circuit therein, the effective reluctance of said magnetic circuit controlling the inductance of said load winding and a control winding wound on said core, said control winding being responsive to current therein for generating magnetic flux in said core, said flux controlling the effective reluctance of said magnetic circuit whereby variations in said flux vary the inductance of said load winding at twice the frequency of said AC voltage;
   a capacitor connected to said load winding to form a resonant circuit therewith;
   means for connecting said AC voltage source to said control winding; and
   output means connected to said resonant circuit.

6. The regulator of claim 5 wherein said resonant circuit is tuned to substantially the frequency of said AC source.

7. The regulator of claim 5 wherein a second capacitor is connected across at least a portion of said control winding.

8. The regulator of claim 5 wherein load means are connected across a portion of said load winding.

9. The regulator of claim 5 wherein a third winding is wound on said core such that it is transformer coupled to said load winding.

10. The regulator of claim 5 wherein a plurality of additional windings are wound on said core such that they are transformer coupled to said load winding.

11. The regulator of claim 9 wherein rectifier means are connected across the output of said third winding.

12. The device of claim 9 wherein a load resistor is connected to said third winding and wherein means are provided for applying an input signal across said load winding.

13. A voltage regulator comprising:
   a source of AC voltage to be regulated;
   an inductor comprising a winding on core means;
   a capacitor;
   means connecting said inductor and said capacitor as a resonant circuit turned to a frequency present in said AC voltage;
   means for varying the inductance of said inductor at substantially twice the frequency to which said resonant circuit is tuned, said means comprising said core means and a control winding wound on said core means;
   means for connecting said AC voltage source to said control winding; and
   output means coupled to said resonant circuit to provide a regulated voltage, the frequency of which is determined by the resonant circuit.

14. The regulator of claim 13 wherein said core means comprises a magnetic core having four common regions and two end portions magnetically joining said common regions.

15. The parametric device of claim 13 wherein said core means comprises a pair of cores, each of said windings having portions wound on each of said cores.

16. The device of claim 15 wherein said portions of said control winding are in adding relation and said portions of said inductor winding are in bucking relation.

17. The regulator of claim 13 wherein said core means comprise a magnetic core having first, second, third and fourth common regions and first and second end portions magnetically joining said common regions, said inductor winding on said core being responsive to current therein for generating a first magnetic flux in said core, said first flux following a first path in said core through said first end portion, said first common region, said second end portion and said fourth common region, and a second path in said core through said first end portion, said second common region, said second end portion and said third common region, said control winding on said core being responsive to current therein for generating a second magnetic flux in said core, said second flux following a third path in said core through said first end portion, said first common region, said second end portion and said second common region and a fourth path in said core through said first end portion, said third common region, said second end portion and said fourth common region, said first and second fluxes being in opposing relationship in two of said common regions and in additive relationship in the other two of said common regions, each of first and second paths including one opposing flux common region and one additive flux common region. voltage from an unregulated AC voltage source comprising initiating oscillation of a resonant circuit of a parametric device, said resonant circuit including inductive and capacitive parameters, varying one of said parameters in response to said unregulated AC voltage and at substantially twice the frequency thereof to transfer energy from said source to said resonant circuit to build the oscillations thereof to the stable point of said parametric device, and continuing to so transfer energy from said source to said resonant circuit to maintain said oscillations at said stable point, and taking said regulated voltage from said resonant circuit.

19. The method of claim 18 wherein said inductive parameter is varied.

20. The method of claim 19 wherein said resonant circuit is tuned to a frequency substantially equal to one present in said unregulated AC voltage.

21. A method of producing a regulated AC voltage from an unregulated AC voltage source, comprising passing current from such unregulated AC voltage source to a parametric device employing magnetic core means, such that the reluctance of said core means changes at twice the frequency of said unregulated AC voltage to transfer energy from said source to said device, using the reluctance change in the core means to pump a resonant circuit employing an inductor on said core and a capacitor having resonance at the same frequency as the unregulated AC voltage in order to transfer energy from the unregulated AC voltage source to the resonant circuit, and taking a regulated output from the resonant circuit at the frequency of the unregulated AC voltage, so that the output waveform is independent from the unregulated AC voltage source and determined by the resonant circuit.

22. The method of claim 21 in which the unregulated AC voltage source is applied to the parametric device by means of a winding on said core means which ordinarily provides no flux coupling with the inductor of the resonant circuit.

23. The method of claim 21 in which the regulated output is taken by a direct coupling from the resonant circuit.

24. The method of claim 21 in which the regulated output is taken by inductive coupling from the resonant circuit.

25. The method of claim 21 wherein energy is transferred to said resonant circuit by varying the inductive component thereof.

26. A method of producing a regulated AC voltage from an unregulated AC voltage source comprising tuning the resonant circuit of a parametric device employing magnetic core means to a frequency substantially equal to one present in the output of said source, initiating oscillation in said resonant circuit to build up said oscillation to the stable oscillation point of said device, passing current from said unregulated AC voltage source to said parametric device such that the reluctance of said core changes at twice the frequency of said unregulated AC voltage to transfer energy from said source to said resonant circuit, using the reluctance change in the core means to pump a resonant circuit employing an inductor on said core and a capacitor having resonance at the same frequency as the unregulated AC voltage and half the frequency of said reluctance change rate to transfer energy from the unregulated AC voltage source to the resonant circuit, and taking a regulated output from the resonant circuit at the frequency of the unregulated AC voltage, so that the output waveform is independent from the unregulated AC voltage source and determined by the resonant circuit.

* * * * *

UNITED STATES PATENT OFFICE
CERTIFICATE OF CORRECTION

Patent No. 3,654,546  Dated April 4, 1972

Inventor(s) Leslie Kent Wanlass

It is certified that error appears in the above-identified patent and that said Letters Patent are hereby corrected as shown below:

Column 1, line 3, after "Device" change the period (.) to a comma (,) and insert --now abandoned.;

line 56, delete "18. A method of producing a regulated AC".

Claim 17, line 58, after "region." delete "voltage from an unregulated AC voltage source...through the last word of the paragraph, i. e. "circuit".

After claim 17, insert --18. A method of producing a regulated AC voltage from an unregulated AC voltage source comprising initiating oscillation of a resonant circuit of a parametric device, said resonant circuit including inductive and capacitive parameters, varying one of said parameters in response to said unregulated AC voltage and at substantially twice the frequency thereof to transfer energy from said source to said resonant circuit to build the oscillations thereof to the stable point of said parametric device, and continuing to so transfer energy from said source to said resonant circuit to maintain said oscillation at said stable point, and taking said regulated voltage from said resonant circuit.--

Signed and sealed this 25th day of July 1972.

(SEAL)
Attest:

EDWARD M. FLETCHER, JR.
Attesting Officer

ROBERT GOTTSCHALK
Commissioner of Patents